Feb. 10, 1959  J. M. MERGEN ET AL  2,872,875
HYDRAULIC POWER UNITS
Original Filed June 24, 1948  3 Sheets-Sheet 3
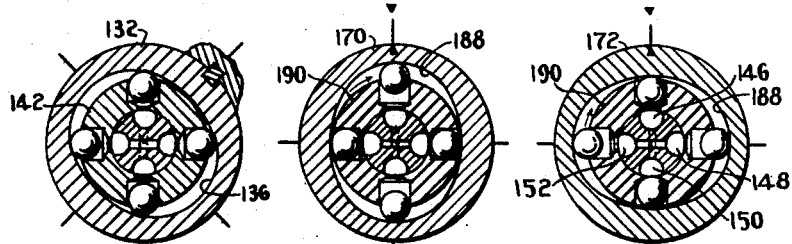
Fig.4a  Fig.4b  Fig.4c
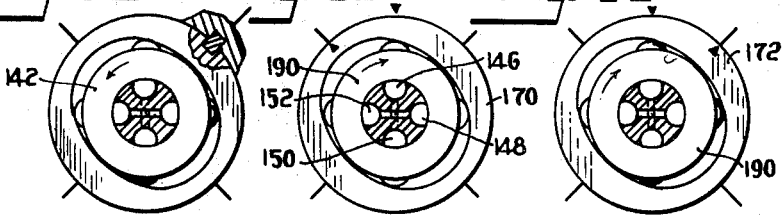
Fig.5a  Fig.5b  Fig.5c
Fig.6a  Fig.6b  Fig.6c
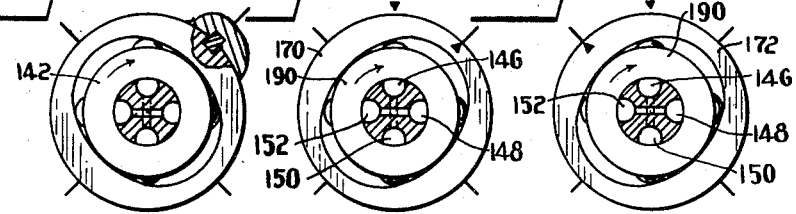
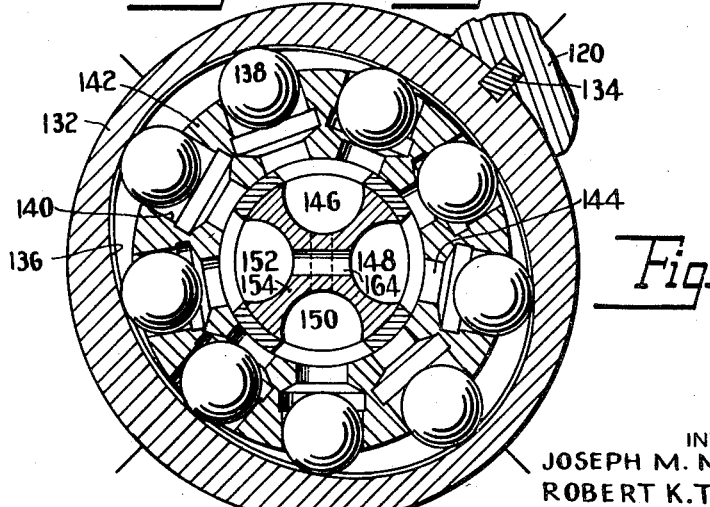
Fig.7
INVENTORS
JOSEPH M. MERGEN
ROBERT K. TIEDEMAN
BY
Godfrey B. Spein
ATTORNEY.

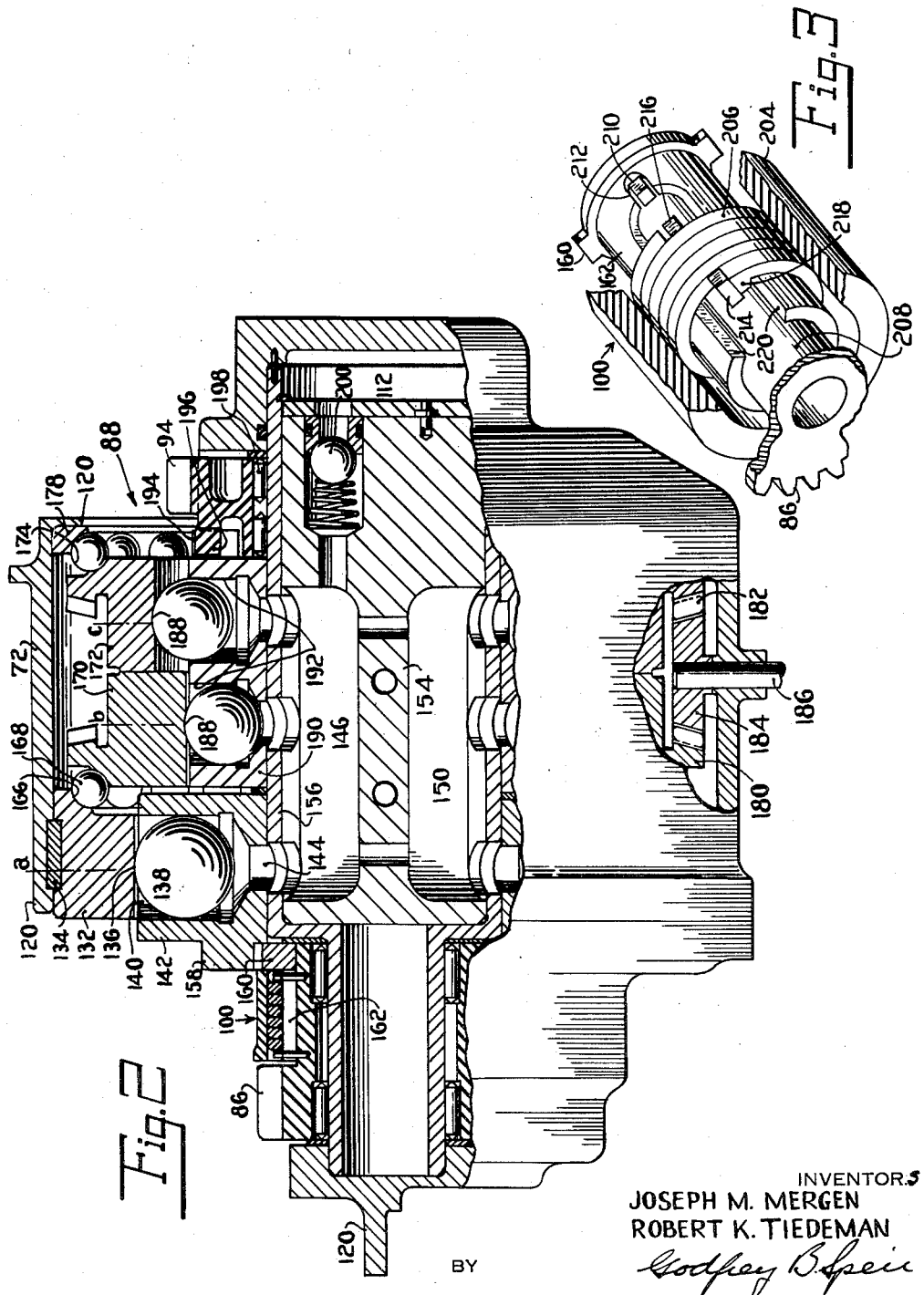

United States Patent Office 2,872,875
Patented Feb. 10, 1959

2,872,875

HYDRAULIC POWER UNITS

Joseph M. Mergen, Verona, and Robert K. Tiedeman, Packanack Lake, N. J., assignors to Curtiss-Wright Corporation, a corporation of Delaware Original application June 24, 1948, Serial No. 34,984, now Patent No. 2,699,220, dated January 11, 1955. Divided and this application June 3, 1954, Serial No. 434,272

2 Claims. (Cl. 103—161)

This invention relates to propellers for aircraft and is concerned essentially with the provision of a new type of controllable pitch aircraft propeller and a control and pitch changing system therefor. It is a division of Application Serial No. 34,984 filed June 24, 1948, which issued as Patent #2,699,220 on January 11, 1955.

An important problem in the design and construction of aircraft propellers is to provide power units for effecting pitch changes therein, having sufficient power to cause pitch change at high rates, concurrently with flexibility to attain rates of pitch change of very low value, the power unit being capable of a smooth transition in rate of pitch change through all ranges needed. The range of the system must likewise be great to enable feathering and reverse pitch of the propeller and to provide safety and auxiliary features to give the scope of operation in the propeller which is expected with present day power plants for aircraft.

It is an object of this invention to provide a propeller and control system whose flexibility of operation is great and whose complexity and weight is minimized. Another object of the invention is to provide a propeller pitch changing power unit, a driving mechanism for the power unit, and a drive from the power unit to the propeller which will yield any reasonable rate of pitch change desired with a minimum of lag in the system, a propeller embodying a power unit having characteristics of this sort being particularly adapted for use in conjunction with gas turbines. It is a further object of the invention to incorporate a close coupled hydraulic pump and motor system as the power unit in a pitch changing mechanism, wherein the pump or motor has variable displacement so that varying rates of pitch change may be secured and so that a wide range of pitch may be attained as for instance from the feathering condition of about 90° positive pitch to a reverse pitch of about —20° or —30°.

The above objectives, along with others, will become apparent in reading the annexed detailed description in connection with the claims and drawings. Only the claims are to be depended upon for defining the limits of the invention. The drawings and associated description are only to be considered as exemplary in outlining suitable structures in which the invention is embodied.

Reference may now be made to the drawings in which similar reference characters indicate similar parts and in which Fig. 1 is a longitudinal section through a portion of a propeller according to the invention;

Fig. 2 is an enlarged longitudinal section, partly broken away, showing the hydraulic pump and motor power unit for effecting propeller pitch change;

Fig. 3 is a fragmentary perspective elevation of a portion of the mechanism of Fig. 2;

Figs. 4a, 4b and 4c are sections, on a reduced scale, through the power unit of Fig. 2 on lines a, b and c respectively, in the adjusted position for zero rate of pitch change;

Figs. 5a, 5b and 5c are end elevations of portions of the power unit substantially on the lines a, b and c respectively of Fig. 2 showing the elements adjusted for maximum rate of pitch change in one direction;

Figs. 6a, 6b and 6c are end elevations of portions of the power unit substantially on the lines a, b and c respectively of Fig. 2 showing the elements adjusted for maximum rate of pitch change in the other direction; and Fig. 7 is an enlarged sectional view of the pump of the power unit shown in Fig. 2, taken substantially on the line a of Fig. 2.

Figure 1:
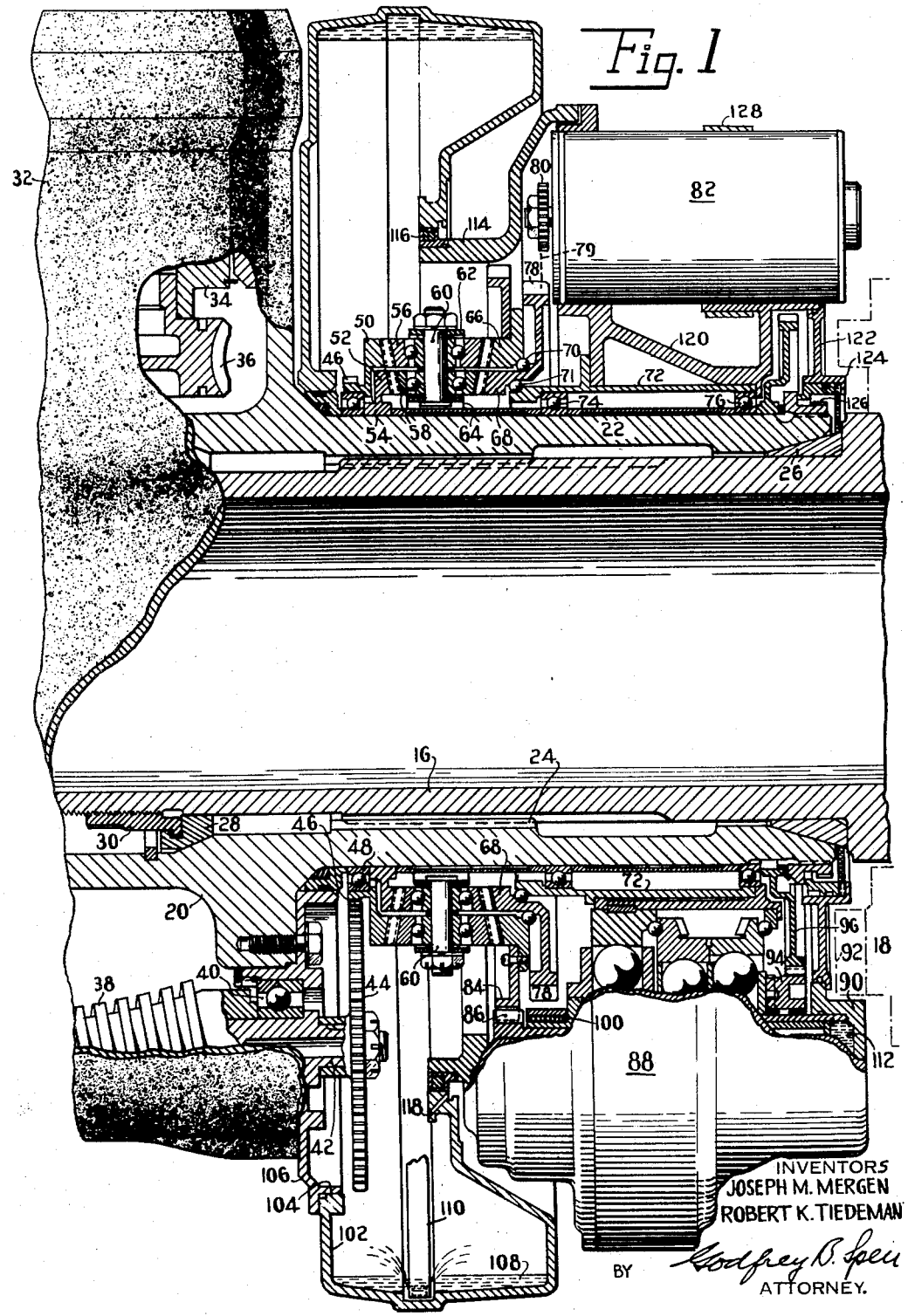

Reference may first be made to Figs. 1 and 2 for an appreciation of the basic propeller structure and power unit system comprising the invention, initial reference being had to Fig. 1. Therein, we show a propeller shaft 16 extending leftwardly as shown from a power plant 18, this shaft being coupled in any desired manner to the driving elements of the power plant which might comprise a gas turbine, a reciprocating engine, or other preferred form of prime mover. A propeller hub 20, having a rearward cylindrical extension 22 embracing the shaft 16, is drivably splined to the shaft as at 24, and is held concentric therewith in the usual manner by conical centering washers, the rear one being shown at 26 and forward one at 28 in conjunction with a propeller hub securing nut 30. The hub comprises blade sockets 32 of any appropriate number, the present invention disclosing a four-way hub to carry four propeller blades. The blades such as 34 are secured in the hub sockets in suitable bearings, each being provided at its inner end with a worm wheel 36 engaged by a worm 38 carried in bearings such as 40 in the hub. The shaft 42 of each worm 38 extends through the rear of the hub, parallel to and spaced from the hub axis and is driven by a blade gear 44 mounted thereon, all said blade gears being coplanar. The several gears 44 of which only one is shown, it being understood that there is one such gear for each blade, mesh with a drive gear 46 embracing and borne for rotation on and relative to the rear hub extension 22 on a bearing 48, the gear 46 having formed as part thereof an outer outboard bevel gear 50. An inner outboard bevel gear 52 is nested within the gear 50 and is secured to the propeller hub extension 22 for rotation therewith, as at 54. Meshing with the bevel gears 50 and 52 are a plurality of sets of beveled planet pinions 56 and 58 respectively, each set of planet pinions being coaxial and being carried on a spider shaft 60, the several spider shafts being secured to bands 62 and 64 embracing and lying within, respectively, the several sets of bevel pinions 56 and 58. The outboard teeth of the pinions 56 and 58 engage the outboard gears 50 and 52. The inboard teeth of the pinions respectively engage two bevel gears 66 and 68, the gear 66 being designated the outer inboard bevel gear and the gear 68 being designated the inner inboard bevel gear. These gears are secured on bearings 70 and 71 in a housing structure 72 embracing the rear hub extension 22 and piloted thereon through bearings 74 and 76.

The inner inboard gear 68 is provided with a spur gear 78 drivably engaged through a gear train not shown but indicated by a dash line 79, with a driving gear 80 of an electrical motor 82. The electric motor as will be noted hereinafter, is provided with a magnetic brake so that under normal operating conditions, the electric motor driving element is held stationary, thereby anchoring the gear 78 and its inner inboard bevel gear 68 against rotation. The outer inboard bevel gear 66 is provided with a spur gear 84, engaged with a driving pinion 86 of a hydraulic pump and motor power unit designated in its entirety by the reference character 88. The unit 88 is mounted upon the housing 72, this housing being held from rotation with the propeller by engagement of a portion thereof such as 90 with a projection 92 on the nose of the prime mover 18. The unit 88 is provided with an input gear 94 engaged with a driving gear 96 embracing and rotatable with the propeller hub rear extension 22, which in turn rotates with the propeller shaft 16.

Let it be assumed, pending the detailed description following, that the unit 88 comprises a variable displacement hydraulic pump and a close coupled hydraulic motor driven by the pump. Propeller shaft driven gear 96 drives the pump gear 94 thereby, when the pump is adjusted to deliver fluid, providing fluid to the motor of the unit 88, the output from the motor being delivered from the motor pinion 86 to the gear 84 thereby driving the outer inboard bevel gear 66 at some finite speed. If the pump output is zero, the motor pinion 86 and the gear 84 are stationary.

The elements 50, 52, 56, 58 and 66, 68 comprise an intergearing to transmit pitch changing motion from the stationary (relative to the aircraft) pitch changing motor to the rotating propeller blades. Their action is as follows: When the gear 68 is held stationary, the gear 52 rotating at propeller speed, the spiders 60 are constrained to rotate about the propeller shaft axis at half propeller speed due to the engagement of the pinions 58 with the gears 68 and 52. Now if no rotary motion be imparted to the gear 66, the outer out-board bevel gear 50 will be constrained to rotate at propeller speed with the gear 52. If, however, rotation is imparted to the gear 66 either in advance of or in retard of the gear 68, similar advancing and retarding rotation, with respect to propeller speed, will be imparted to the gear 50. Such rotative motion of the gear 50 is then transmitted to the drive gear 48 and the blade gears 44 to cause pitch changing rotation of the propeller blades through the worm and wheel connection 38, 36.

If it be assumed that operation of the power unit 88 has ceased for any reason, the output gear 86 of the motor of the unit 88 is anchored against rotation by the interposition of a bi-directional no-back brake 100 which will be described. Now, it may be assumed that the electric motor 82 may be utilized to effect blade pitch change. The outer inboard bevel gear 66 locked through gear 84 to the pinion 86 now becomes the anchor gear for the transfer gearing and, through the pinion 56 meshed therewith, and the pinion 58 constrained to travel about the propeller shaft with the pinion 56, and engagement of the pinion 58 with the propeller speed bevel gear 52, the planet carrier 60 is constrained to travel at half propeller speed. Now, if the inner inboard bevel gear 68 is rotationally advanced or retarded relative to the anchor gear 66, as by operation of the electric motor 82 in either direction, pitch changing movement will be imparted through the pinions 58 and 56 to the outboard outer bevel gear 50 and thence, in the manner previously described, to the propeller blades. When pitch changing movement is caused by the motor 82, the spiders 60 rotate about the propeller shaft at a controlled speed differing slightly from half propeller speed.

Thus, either inboard bevel gear 66 or 68 may become an anchor gear while the other may become a pitch changing driving gear according to whether the pitch changing power unit 82, or 88 is selected for use.

The intergearing system above described is contained within an annular housing 102 secured to the inboard side of the propeller hub, said housing including apertures as at 104 of sufficient size to enable its installation over the blade gears 44. Sub-housings 106 are associated with housing 102 to provide a closure between the blade gears 44 and the propeller hub. The housing 102 further comprises an oil or hydraulic fluid sump and, since the housing rotates with the propeller the fluid therein is hurled to the periphery of the sump as shown at 108, said fluid being pressurized centrifugally. The centrifugally pressurized fluid is utilized to charge the hydraulic power unit 88 through the medium of a scoop 110 having an entrance opening adjacent the periphery of the housing 102, said scoop being connected by means not shown to feed one end of the hydraulic unit 88 as at 112. The propeller system is further provided with an intermediate non-rotating housing 114 with an annular outboard portion which has rotatable sealing engagement with the housing 102 as at 116, the seal at 116 preventing leakage of fluid in the housing and being provided with a drain 118 for the return of fluid seepage to the sump. The housing 114 is secured to another housing portion 120 carrying the power units 82 and 88 and associated control and gear mechanism which are revealed in the schematic figures the portion 120 engaging, and being supported by, the housing 72 piloted on the propeller. The inboard end of the housing portion 120 is provided with a cover 122 having sealing engagement at 124 with an extension 126 secured to the inboard end of the hub extension 22, the cover 122 providing a closure for the gear 96 which serves to drive the power unit 88. Appropriate gaskets, seals and securing devices familiar to the skillful designer are incorporated in the housing system and the structure contained therein at appropriate locations, some of these seals etc. being shown but not being identified particularly by reference characters. It may be further noted that the electric power unit 82 is secured upon the housing portion 120 as by a clamp band 128 so that it may be readily removed should replacement or servicing be required, and so that a more or less standard motor unit of appropriate design may be incorporated in the propeller system.

*Description of hydraulic power unit*

Reference may now be had to Fig. 2 which shows the hydraulic power unit 88 in considerable detail. In this figure, the pump input gear 94 will be recognized at the right hand end of the assembly, and the motor output gear 86 will be recognized at the left hand end of the assembly. The power unit is preferably contained in a portion of the housing component 120. It consists of a motor race 132, externally circular as shown in Fig. 7 and keyed as at 134 against rotation in the housing 120. The inner run of the race 132 is elliptical in form and includes a shallow central groove 136 to provide a raceway for a plurality of hardened balls 138 of steel or equivalent. These balls are reciprocable in individual cylinders 140 formed radially in a rotatable ball carrier 142, each cylinder communicating at its inner end with a radial passageway 144 through which hydraulic liquid may enter or leave the cylinder from or to transfer passages 146, 148, 150 or 152 (see Fig. 7) formed in a non-rotating core piece 154. A ported sleeve 156 is fitted between the ball carrier 142 and the core piece 154, this sleeve being non-rotatable relative to the core piece and the housing 120, and providing a bearing surface upon which the ball carrier 142 may rotate. The ball carrier 142 comprises the driving element of a motor and is provided with driving ears 158 engaging lugs 160 on the driving member 162 of a bi-directional no-back brake unit 100, whose details of construction are shown in Fig. 3.

Referring now to Fig. 7, assume that the core piece passages 152 and 148, which are interconnected by drillings 164, are provided with pressurized hydraulic fluid. Assume likewise that the interconnected passages 146 and 150, at right angles to the other passages comprise a low pressure zone. Pressure fluid passes from the passages 152 and 148 into those cylinders 140 in the upper and lower quadrants of the raceway 136, urging the balls 138, which act as pistons, outwardly to engage the raceway. These quadrants are identified as the zones between the major and minor axes of the elliptical raceway 136. The raceway slope in these quadrants is such that, when the corresponding cylinders 140 are pressurized, the balls move outwardly and enforce clockwise rotation of the ball carrier 142. As a ball and cylinder approach the major axis of the elliptical raceway 136, its passage 144 is cut off from communication with the feed passage 148 or 152 and shortly, such passage 144 is opened to either of the core piece passages 146 or 150. Thereupon, as the balls are pushed inwardly within their respective cylinders when bearing on the lateral quadrants of the raceway, fluid is driven from the cylinders 140 until the passages 144 nearly reach the minor diameter points on the elliptical raceway 136. Thereafter, the sequence for each cylinder begins again for the outward movement of the balls 138 in their cylinders under the influence of high pressure fluid. This mechanism in effect is a radial cylinder piston pump, the balls comprising the pistons, and by virtue of the elliptical raceway provides two strokes for each ball piston for each revolution of the raceway. A pump of high capacity and small bulk is attained by the use of the ball piston technique and thus this type of pump is extremely appropriate for utilization in an aeronautical propeller.

Referring now to Fig. 2, the leftward or inboard end of the nonrotating motor race 132 is formed with a ball bearing raceway 166 engaged by bearing balls 168 which in turn support a pump race 170. Against the inboard face of the race 170, a second pump race 172 bears, the latter having at its far end a ball bearing raceway 174 engaged by bearing balls 176 which in turn engage a stationary ball race 178 fitted within the housing 120. Thus the two ball races 170 and 172 which are portions of a pump unit, are concentrically supported for relative rotative movement within the housing 120. Both of these races are provided with bevel gear portions 180 and 182 facing one another, said gears being engaged by one or more housing-mounted bevel pinions 184. One of these pinions includes a central shaft 186. Rotation of the shaft 186 causes equal and opposite rotation of the pump races 170 and 172 for a purpose which will become apparent shortly. Also, drive reaction when the pump is under load is assumed by the pinions 184 and is transmitted thereby to the housing 120. Since the drive reaction on both races 170 and 172 will be the same in magnitude and direction, and is assumed in a balanced manner by the pinions, control of position of the races 170 and 172 may be made by turning the pinion 184 without any appreciable torsional load on the pinion shaft 186.

Both races 170 and 172 are provided with elliptical raceways 188 of the same general configuration but smaller in diameter than the raceway 136 of the motor unit. A ball carrier 190 carries tandem sets of radial cylinders 192 which, like the cylinders 140 of the motor unit, communicate with passageways leading to the several core passages 146 to 152, through appropriate openings in the sleeve 156. The pump ball carrier 190 is rotatably mounted upon the sleeve 156 and is provided with one or more driving dogs 194 drivably engageable with coacting dogs 196 formed upon the hub of the pump driving gear 94. The latter may be rotatably carried on the stationary sleeve 156 through needle bearings 198. It will be seen that the passages 146 to 152 extend axially to establish free communication between alined sets of pump cylinders 192 and motor cylinders 140.

Means are provided to feed hydraulic liquid or oil to the power unit 88, such means including a chamber 112 formed at the end of the pump housing 120, said chamber being in communication with the fluid pickup 110 previously described in connection with Fig. 1. A spring loaded ball check valve 200 is disposed between the chamber 112 and the core passages 146 and 150, a similar check valve not shown being provided between the chamber 112 and the cored passages 148 and 152. Through one or the other of these valves, whichever is at low pressure, fluid may pass to the pump-motor system to make up for such leakage as may occur in the operation thereof.

Reference may now to be made to Figs. 4a, 4b and 4c which show schematically, the position relationships of the pump and motor elements for zero pump output and consequently for zero motor output. Herein, the races 170 and 172 for the pump are adjusted by means of the pinion 184 of Fig. 2, so that the major axis of the elliptical raceway 188 of the race 170 is vertical and the major axis of the raceway 188 of the race 172 is horizontal as shown. The elliptical raceway 136 of the motor race 132 remains with its major axis fixed at an angle of 45°, the same as in Fig. 7. Now, assuming that the pump ball carrier 190 is rotated clockwise by the drive gear 94, the balls in Figs. 4b and 4c will pump during about half of their travel through each quadrant of the elliptical raceway and will suck during the other half of the quadrant travel. Since the pumping and suction functions in Figs. 4b and 4c are out of phase with one another, there will be no effective pump output to pressurize either pair of core passages 146, 150 or 148, 152. Thus, no effective fluid pressure will be delivered to the motor unit of Fig. 4a and the ball carrier 142 of the motor will not be driven.

Now reference may be made to Figs. 5a, 5b and 5c. Here, the pump race 170 in Fig. 5b has been turned 45° to the left of the vertical while the pump race 172 of Fig. 5c has been turned 45° to the right, by the action of the bevel pinion 184 of Fig. 2. The elliptical raceways of the two races have the same position relationship to the cored passages 146—152, their major axis being sloped 45° from the left of vertical. Still assuming clockwise rotation of the ball carrier 190, the upper and lower quadrants of the ellipses will be pumping zones and the lateral quadrants will be suction zones in both units of the pump. Accordingly, the passages 146 and 150 will be pressurized, the fluid passing along these passages and causing rotation of the ball carrier 142 of the motor in a counterclockwise direction. The positions of the pump races 170 to 172 in Figs. 5b and 5c represent maximum pump output in one direction and it is clear that any relative positions of the pump races 170 and 172 between the positions represented by Figs. 4b and 4c on the one hand and 5b and 5c on the other hand will cause an intermediate amount of liquid delivery between zero and maximum to cause hydraulic motor operation at an intermediate speed between zero and maximum in the counterclockwise direction. Thus, relative adjustment of the races 170 and 172 through the pinion 184 may be made rapidly and expeditiously to control the rate of delivery of the pump units and thus to control the speed rate of the motor rotor 142.

In Figs. 6b and 6c, the races 170 and 172 have been rotated through operation of the pinion 184 so that the major axes of the elliptical races lie 45° to the right of the vertical. Thus, with clockwise rotation of the ball carrier 190, the cored passages 148 and 152 will receive pump delivery and will be pressurized, while the core passages 146 and 150 are feed passages for the pump cylinders, receiving the fluid discharged from the motor unit in Fig. 6a. With pressurized passages 148 and 152 the motor ball carrier 142 is forced to rotate in a clockwise direction—the reverse direction from that shown in Fig. 5a. When the major axes of the elliptical races of the raceways 170 and 172 are parallel and sloped as shown in Figs. 6b and 6c, the dual pump yields maximum delivery to operate the motor in the direction indicated in Fig. 6a. Likewise, any position of the major axes of the raceway ellipses between those of Figs. 6b and 6c on the one hand and Figs. 4b and 4c on the other hand, will produce rotation of the motor rotor 142 at reduced speed.

The close coupling of the pump and motor units of the power unit 88, above described, enables unified compact construction thereof wherein fluid pressures may be very high, and wherein pressurized fluid pressures may be very high, and wherein pressurized fluid is confined wholly within the unit. Extensive sealing and plumbing provisions become unnecessary. All of the fluid lines in the entire system other than those integrally contained within the hydraulic power unit are low pressure lines whereby leakage is minimized.

It is further noted that the ball piston arrangements of the pump and motor components of the power unit 88 are not per se, a part of this invention. It is considered that the piston pump control system herein disclosed is novel and inventive. It is further considered that propeller pitch changing and control systems using a hydraulic pump-motor unit of the type herein disclosed, or other close coupled hydraulic pump-motor units, whether or not ball pistons are used are novel and inventive.

It is a characteristic of the hydraulic pump-motor unit disclosed herein, particularly as used in the propeller disclosed that there is no power drain from the pump prime moving instrumentality except when power delivery from the motor is called for, and it is further characteristic of the unit that the power drain from the prime mover is in proportion to the power required for any instant pitch changing need, the power unit being unloaded when there is no pitch change demand. It is within the purview of the invention, however, to use the power unit for holding pitch, without, necessarily, utilizing a separate braking unit to anchor the system against rotation when there is no demand for pitch change.

Though one embodiment illustrating the invention has been shown and described, it is to be understood that the invention may be applied in other and various forms. Changes may be made in the arrangements without departing from the spirit of the invention. Reference should be had to the appended claims for definitions of the limits of the invention.

We claim:

1. A unidirectionally driven hydraulic pump comprising a non-rotating shaft having pairs of alternatively arranged conduits in the surface thereof, a member journalled on said shaft, means to rotate said member, said member having tandem rows of radial cylinders formed therein, there being a plurality of cylinders in each row, said member including a passage from each cylinder to the member bore where it is journalled on the shaft to connect the corresponding cylinder to one or another of said shaft conduits according to the rotational position of said member on said shaft, a piston slidable in each cylinder, substantially annular members each having a substantially elliptical internal cam track, one such member embracing each row of cylinders and engaged with the pistons thereof, movable means connected to said annular members operable to adjust them simultaneously and in opposite directions, said movable means being operable to adjust the major axes of the ellipses of said cam tracks between parallelism for full pumping action in one direction and parallelism on a plane 90° from the first plane of parallelism for full pumping action in the opposite direction; said cam tracks being adjustable to right angled relation of the major axes of their ellipses for zero net flow of the pump but for interflow of working fluid between the cylinders of the two rows.

2. A hydraulic pump according to claim 1 including fluid-admitting check valves mounted on said non-rotating shaft, one for each pair of conduits thereof, constructed to admit fluid to either of said conduit pairs but to prevent the out-flow of fluid therefrom.

References Cited in the file of this patent

UNITED STATES PATENTS

| | | |
|---|---|---|
| 932,033 | Krone | Aug. 24, 1909 |
| 1,152,729 | Hele-Shaw | Sept. 7, 1915 |
| 1,904,496 | Maw | Apr. 18, 1933 |
| 2,211,402 | Benedek | Aug. 13, 1940 |
| 2,237,018 | Tweedale | Apr. 1, 1941 |
| 2,303,685 | Eden et al. | Dec. 1, 1942 |
| 2,458,985 | Ferris et al. | Jan. 11, 1949 |
| 2,462,500 | Hoffer | Feb. 22, 1949 |
| 2,474,536 | Lundegard | June 28, 1949 |
| 2,496,915 | Hoffer | Feb. 7, 1950 |
| 2,646,755 | Joy | July 28, 1953 |

FOREIGN PATENTS

| | | |
|---|---|---|
| 484,425 | Italy | Sept. 10, 1953 |